(12) United States Patent
Thomas et al.

(10) Patent No.: US 8,116,242 B2
(45) Date of Patent: Feb. 14, 2012

(54) RECEIVER HAVING MULTI-ANTENNA LOG LIKELIHOOD RATIO GENERATION WITH CHANNEL ESTIMATION ERROR

(75) Inventors: Timothy A Thomas, Palatine, IL (US); Thomas P Krauss, Algonquin, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1303 days.

(21) Appl. No.: 11/458,369

(22) Filed: Jul. 18, 2006

(65) Prior Publication Data

US 2008/0019331 A1    Jan. 24, 2008

(51) Int. Cl.
    *H04B 7/00* (2006.01)
(52) U.S. Cl. ........................................... 370/310
(58) Field of Classification Search .............. 370/310, 370/336, 338; 455/101, 103
    See application file for complete search history.

(56) References Cited

U.S. PATENT DOCUMENTS

| | | | | |
|---|---|---|---|---|
| 7,027,533 B2* | 4/2006 | Abe et al. | | 375/341 |
| 7,151,808 B2* | 12/2006 | Fujii et al. | | 375/347 |
| 7,317,770 B2* | 1/2008 | Wang | | 375/340 |
| 7,333,421 B2* | 2/2008 | Li | | 370/208 |
| 7,333,540 B2* | 2/2008 | Yee | | 375/232 |
| 7,372,896 B2* | 5/2008 | Bjerke et al. | | 375/148 |
| 7,701,917 B2* | 4/2010 | Mantravadi et al. | | 370/343 |
| 2002/0161560 A1* | 10/2002 | Abe et al. | | 702/196 |
| 2004/0042565 A1* | 3/2004 | Garrett | | 375/341 |
| 2004/0083082 A1* | 4/2004 | Onggosanusi et al. | | 703/2 |
| 2005/0174983 A1 | 8/2005 | Naguleswaran et al. | | |
| 2005/0176436 A1 | 8/2005 | Mantravadi et al. | | |
| 2005/0190800 A1 | 9/2005 | Maltsev et al. | | |
| 2005/0190868 A1 | 9/2005 | Khandekar et al. | | |
| 2006/0023636 A1* | 2/2006 | Farhang-Boroujeny et al. | | 370/252 |
| 2006/0203794 A1* | 9/2006 | Sampath et al. | | 370/344 |

OTHER PUBLICATIONS

Abe T et al, "A mimo turbo equalizer for frequency-selective channels with unknown interference", IEEE Transactions on Vehicular Technology, IEEE Service Center, May 2003, pp. 476-482, vol. 52, No. 3, Piscataway, NJ, US.
Weiyu Xu et al, "An efficient tree search algorithm for optimal detection of MIMO signals with channel estimation errors", Vehicular Technology Conference, IEEE 60th, Sep. 26-29, 2004, Los Angeles, CA, USA, IEEE Sep. 26, 2004 pp. 1503-1507, Piscataway, NJ, USA.
Ting-Jung Liang et al, "Iterative Joint Channel Estimation and Decoding Using Superimposed Pilots in OFDM-WLAN", Communications, ICC '06, IEEE International Conference, IEEE, PI, Jun. 2006, pp. 3140-3145.

(Continued)

*Primary Examiner* — Lester Kincaid
*Assistant Examiner* — Nathan Mitchell

(57) ABSTRACT

A receiver and methods of operation wherein Log-Likelihood-Ratio calculation are performed for arbitrary channel estimators with linear Minimum-Mean-Square-Error (MMSE) combining, successive cancellation combining, or joint detection. In some embodiments, the use of linear MMSE or successive cancellation combining may be employed to greatly lower the computational complexity over joint detection.
In (401) a channel estimation MSE as a function of frequency, the transmitter modulation type, and a noise power are provided to the LLR component (313). A signal from a transmitter is received at one of the various antennas (301), (303) and respective receiver component (305), (307) in block (403). The channel estimation component (309) computes a channel estimate for the signal from the transmitter, or computes multiple channel estimates for multiple transmitter sources, in block (405). In block (407), decoder inputs are determined as a function of the channel estimates, the received signal, noise power, and channel estimation MSE.

13 Claims, 12 Drawing Sheets

OTHER PUBLICATIONS

Thomas T A et al, "A method for improving the performance of successive cancellation in mobile spread mimo ofdm" IEEE 56th, Vehicular Technology Conference Proceedings, IEEE Vehicular Technology Conference, Sep. 24, 2002, pp. 18-22, vol. 1 of 4 Conf. 56, New York, New York, US.

Benjillali M et al, "On reliability metrics for soft-input decoding in presence of channel estimation errors",IEEE 63rd Vehnicular Technology Conference, May 2006, pp. 2548-2552, Piscataway, NJ, US.

Stephen J Grant et al, "Performance Enhancement Through Joint Detection of Cochannel Signals Using Diversity Arrays", IEEE Transactions on Communications, IEEE Service Center, Aug. 1998, vol. 46, No. 8, Piscataway, NJ, US.

S. Le Goff, A. Glavieux and C. Berrou, "Turbo-Codes and High Spectral Efficiency Modulation," SUPERCOMM/ICC 1994, Conference Record, Serving Humanity Through Communications. IEEE International Conference on Communications, vol. 2, pp. 645-649 (May 1994).

M. M. Wang, W. Xiao, T. Brown, "Soft Decision Metric Generation for QAM with Channel Estimation Error," IEEE Transactions on Communications, vol. 50, No. 7, pp. 1058-1061, Jul. 2002.

T. A. Thomas and F. W. Vook, "A Method for Improving the Performance of Successive Cancellation in Mobile Spread MIMO OFDM," Proc. IEEE VTC-2002/Fall, Vancouver, Canada, pp. 18-22, Sep. 2002.

T. A. Thomas, K. L. Baum, and F. W. Vook, "Modulation and Coding Rate Selection to Improve Successive Cancellation Reception in OFDM and Spread OFDM MIMO Systems," Proc. IEEE ICC 2003, Anchorage, Alaska, pp. 2842-2846 May 2003.

F. W. Vook, T. A. Thomas, "MMSE Multi-User Channel Estimation for Broadband Wireless Communications," IEEE Globecom-2001, San Antonio TX, pp. 470-474 Nov. 26-29, 2001.

T. A. Thomas, F. W. Vook, K. L. Baum, "Least-Squares Multi-User Frequency-Domain Channel Estimation for Broadband Wireless Communication Systems," Proc. 37th Allerton Conference, Monticello, IL, Sep. 1999.

B. Steiner, "Time Domain Channel Estimation in Multi-carrier-CDMA Mobile Radio System Concepts," in Multi-Carrier Spread-Spectrum, pp. 153-160, Kluwer Academic Publishers, 1997.

B. Lu, G. Yue, and X. Wang, "Performance Analysis and Design Optimization of LDPC-Coded MIMO OFDM Systems," IEEE Transactions on Signal Processing, vol. 52, No. 2, pp. 348-361 Feb. 2004.

C. Berrou, A. Glavieux, and P. Thitimajshima, "Near Shannon Limit Error-Correcting Coding and Decoding," Proc. IEEE ICC-1993, Geneva Switzerland, pp. 1064-1070 May 1993.

R. Gallager, "Low-Density Parity-Check Codes," IRE Transactions on Information Theory, vol. 7, Jan. 1962.

Maxime Flament, et al, "Joint Channel Estimation and Turbo Decoding for OFDM-based Systems", pp. 1299-1303, Gothenburg, Sweden, Oct. 2002.

* cited by examiner

RECEIVER HAVING MULTI-ANTENNA LOG LIKELIHOOD RATIO GENERATION WITH CHANNEL ESTIMATION ERROR

FIELD OF THE DISCLOSURE

The present disclosure relates generally to communication systems, and more particularly to communication system receivers and improved methods and apparatus for providing channel decoder inputs.

BACKGROUND

Orthogonal Frequency Division Multiplexing (OFDM) provides good data throughput for a given bandwidth and is therefore widely employed for wireless systems. OFDM has been adopted by various wireless standards such as IEEE 802.11a, 802.16, ETSI HIPERLAN/2 as well as digital video broadcasting (DVB).

Channel estimation is of critical importance to OFDM because the channel varies across the frequency domain subcarriers and also across OFDM symbols in time.

Channel decoders (e.g., turbo or Low-Density Parity Check (LDPC) decoders) need inputs to be able to properly decode the received coded waveform and one type of input is the Logarithm of the Likelihood Ratio (LLR). A standard means of computing LLRs given a channel estimate in an OFDM system is to generate the LLRs using the channel estimates based on a flat Rayleigh fading assumption (because an OFDM channel estimate on a particular subcarrier looks like it is flat Rayleigh faded). However, such techniques assume correct channel estimates and will not work well when there is significant channel estimation error.

Techniques do exist for accounting for channel estimation error when computing LLRs in OFDM systems. For example, in M. M. Wang, W. Xiao, & T. Brown, "Soft Decision Metric Generation for QAM With Channel Estimation Error," IEEE Transactions On Communications, Vol. 50, No. 7 (July 2002), a system is described which considers channel estimation Mean Square Error (MSE) when computing LLRs in OFDM. However, the disclosed techniques do not consider the multi-user aspect, and do not consider the frequency-domain channel estimation MSE, which is not uniform across frequency. Further, such techniques have not considered LLR generation for antenna combining algorithms such as Minimum Mean Square Error (MMSE), successive cancellation, and maximum likelihood detection (which is also known as joint detection).

Therefore, such systems have been limited to a single data source and a single receiving antenna. Other techniques, for example LLR generation for LDPC codes in Multiple-Input/Multiple-Output (MIMO) OFDM, also neglect channel estimation error, or otherwise neglect the fact that channel estimation error can vary greatly across frequency, and therefore such techniques will not work well for cases having significant channel estimation error.

Further, the performance of turbo-coded or LDPC-coded OFDM channels can be seriously degraded when the channel estimation error is not accounted for especially for higher order Quadrature Amplitude Modulations (QAM) such as 16-QAM and 64-QAM.

Therefore what is needed is an apparatus and method for computing LLRs for single or multiple data streams and multiple antenna combining techniques while accounting for channel estimation error.

DETAILED DESCRIPTION

Figure 1:
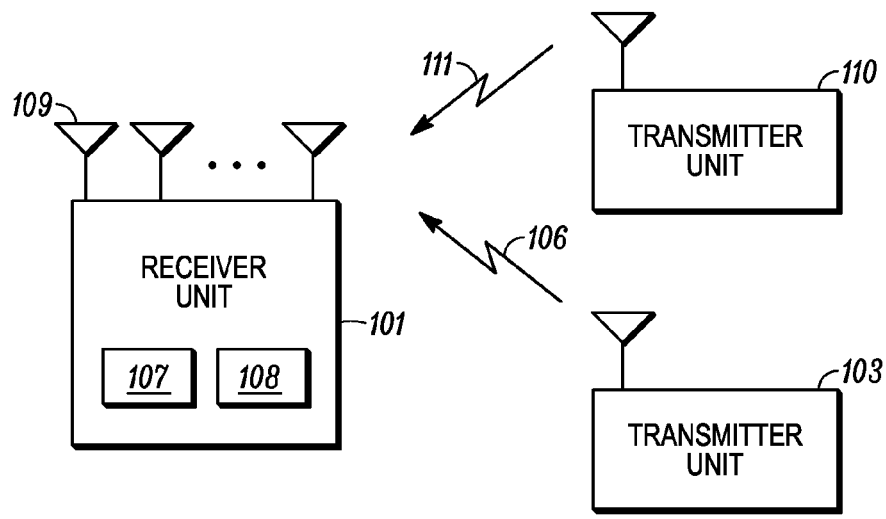
FIG. 1 is a block diagram of a Spatial Division Multiple Access (SDMA) network wherein multiple transmitters communicate with a receiver having multiple receiving antennas.

A method and apparatus which provides channel decoder input generation for various antenna combining techniques while accounting for channel estimation error is provided herein.

In some embodiments, channel decoder inputs will be Log-Likelihood Ratios (LLRs) which may be considered generally to be a codeword component, the codeword being an encoded message encoded on a transmitting side, and a noise component.

In the various embodiments herein disclosed, LLR calculation may be performed for arbitrary channel estimators with linear MMSE combining, successive cancellation combining, and joint detection. Further, in some embodiments, computational complexity may be greatly reduced by the use of channel estimation other than the full MMSE channel estimator. In additional embodiments, the use of linear MMSE or successive cancellation combining may be employed to greatly lower the computational complexity over joint detection. In yet other embodiments, the use of approximate maximum likelihood methods such as sphere decoding may be employed to greatly lower the computational complexity over joint detection.

It will be appreciated that LLR calculation, channel estimation and otherwise processing received signals may be performed in a dedicated device such as a receiver having a dedicated processor, a processor coupled to an analog processing circuit or receiver analog "front-end" with appropriate software for performing a receiver function, an application specific integrated circuit (ASIC), a digital signal processor (DSP), or the like, or various combinations thereof, as would be appreciated by one of ordinary skill. Memory devices may further be provisioned with routines and algorithms for operating on input data and providing output such as operating parameters to improve the performance of other processing blocks associated with, for example, reducing noise and interference, and otherwise appropriately handling the input data.

It will further be appreciated that wireless communications units may refer to subscriber devices such as cellular or mobile phones, two-way radios, messaging devices, personal digital assistants, personal assignment pads, personal computers equipped for wireless operation, a cellular handset or device, or the like, or equivalents thereof provided such units are arranged and constructed for operation in accordance with the various inventive concepts and principles embodied in exemplary receivers, and methods for generating or determining channel decoder inputs including, but not limited to LLRs, channel estimation, and accounting for channel estimation error as discussed and described herein.

The inventive functionality and inventive principles herein disclosed are best implemented with or in software or firmware programs or instructions and integrated circuits (ICs) such as digital signal processors (DSPs) or application specific ICs (ASICs) as is well known by those of ordinary skill in the art. Therefore, further discussion of such software, firmware and ICs, if any, will be limited to the essentials with respect to the principles and concepts used by the various embodiments.

Turning now to the drawings wherein like numerals represent like components, FIG. 1 illustrates a spatial division multiple access (SDMA) or spatial division multiplexed (SDM) network 100. In such SDMA networks, a receiver 101 includes a number of antennas 109 which may be referred to as a smart antenna system. The multiple antennas 109, or smart antenna system 109, may receive several data streams or input signals on the same frequency simultaneously, that is, on the same time-frequency resource.

For example, transmitter unit 103 and transmitter unit 110 may transmit data stream 106 and data stream 111 respectively, which may be received by receiver 101 simultaneously using multiple antennas 109. The SDMA network approach increases the aggregate data throughput nearly proportionally to the number of antennas at the receiver. In the various embodiments, LLRs are determined for each transmitter, such as transmitter 103 and transmitter 110, transmitting on the same time-frequency resource or channel. Thus, in the various embodiments receiver 101 will have receiver components 107, comprising receiving components appropriate for, and corresponding to the multiple antennas 109. Also in the various embodiments, receiver 101 will have components 108 which comprises a channel estimation component, an LLR calculation component, a channel decoding component and a storage component.

Figure 2:
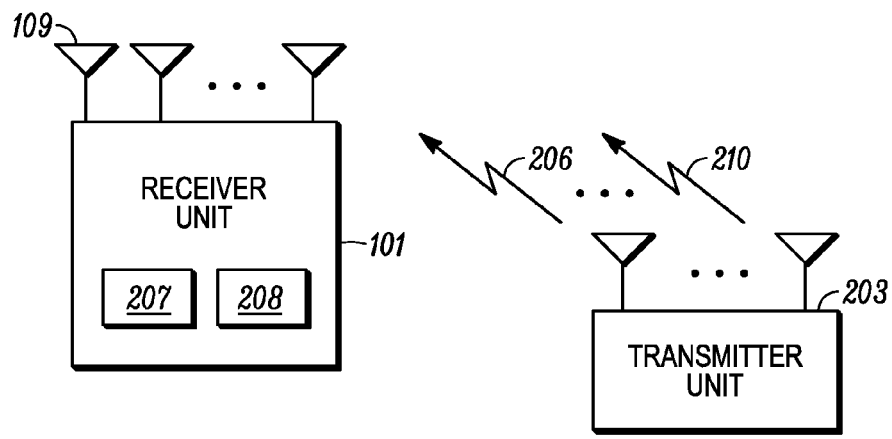
FIG. 2 is a block diagram of a Multiple Input, Multiple Output (MIMO) network wherein a transmitter having multiple transmit antennas transmits multiple data streams to a receiver having multiple receive antennas.

FIG. 2 illustrates a Multiple Input, Multiple Output (MIMO) network 200 in which data throughput between a receiver and transmitter is improved using multiple antennas or smart antennas. In FIG. 2, receiver 201 has multiple antennas 209 and transmitter 203 likewise has multiple antennas 210. Transmitter 203 may transmit a set of data streams, such as data streams 206 through 210, simultaneously. Similar to FIG. 1, in the various embodiments receiver 201 will have receiver components 207, comprising receiving components appropriate for, and corresponding to the multiple antennas 209; and components 208 which comprises a channel estimation component, an LLR calculation component, a channel decoding component and a storage component.

Further network 100 and network 200, may employ any of various modulation and coding schemes for the air interfaces between transmitters and receivers. For example, Quadrature Amplitude Modulation (QAM) may be employed including, but not limited to, 16-QAM, 64-QAM, etc. Additionally, various approaches to channelization of signals and/or subcarriers may be employed, such as but not limited to, Code Division Multiple Access (CDMA), Time Division Multiple Access (TDMA), etc. Further, such approaches may be used in combination with each other and/or other techniques such as Orthogonal Frequency Division Multiplexing (OFDM) such that various sub-carriers employ various channelization techniques. The air interfaces may also conform to various interfaces such as, but not limited to, 802.11, 802.16, etc.

Figure 3:
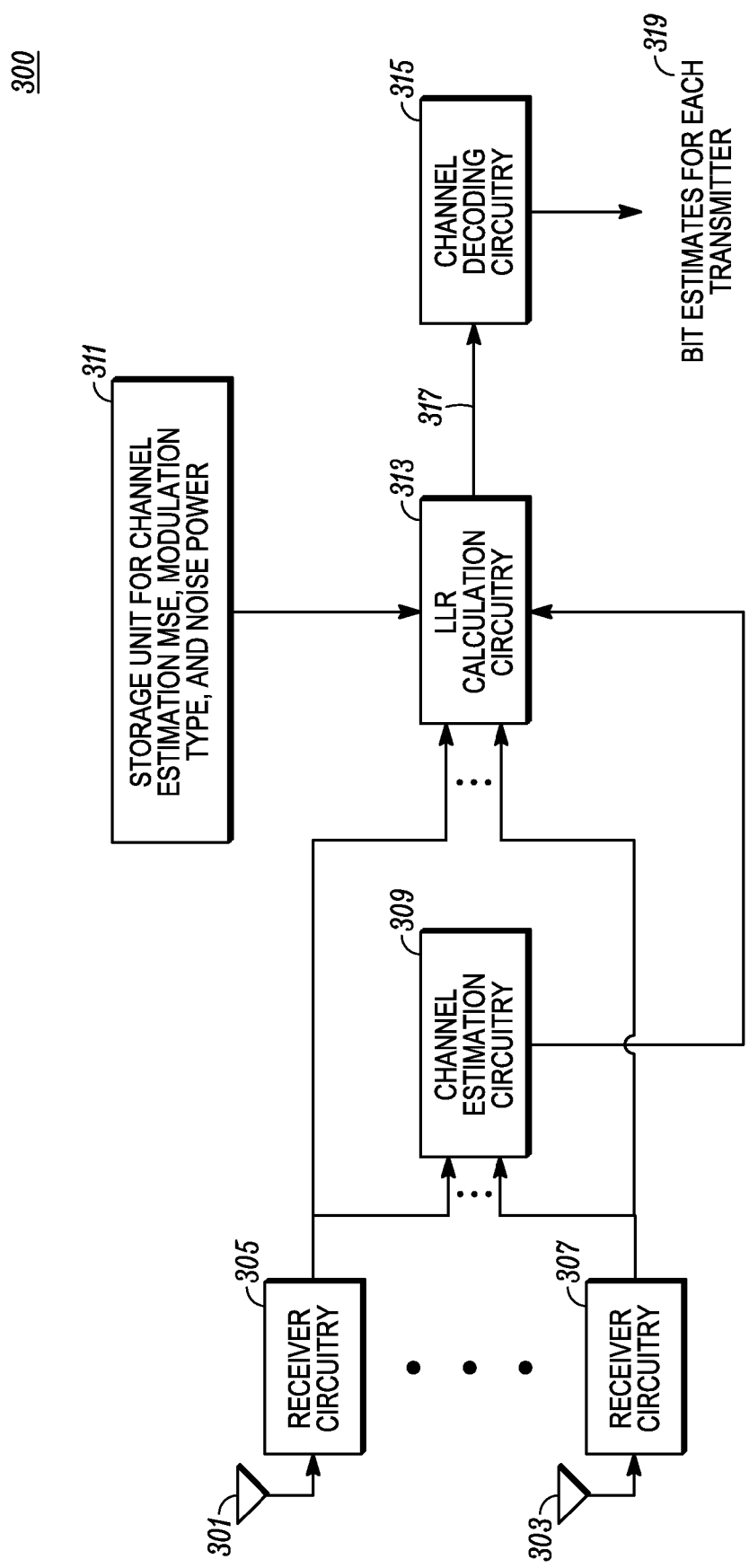
FIG. 3 is a block diagram illustrating high level components of a receiver in accordance with the various embodiments.

FIG. 3 illustrates high level components in accordance with a receiver embodiment for example, components 107 and 108 in FIG. 1 and components 207 and 208 in FIG. 2. A number of antennas such as antenna 301 and antenna 303 provide inputs to respective receiver circuitries 305 and 307. Received inputs are, in general, demodulated such that a channel estimation vector, via channel estimation circuitry 309, and set of LLRs, via LLR calculation circuitry 313, is computed for each channel resulting in a channel decoder 315 channel decoder input 317, that is, in general, a combination of a codeword and noise power from storage unit 311. In the embodiment illustrated by FIG. 3, the LLR circuitry 313 employs channel estimation MSE in addition to modulation type and noise power to determine the channel decoder input 317. The channel decoder 315 then determines bit estimates 319 for each transmitter.

Figure 4:
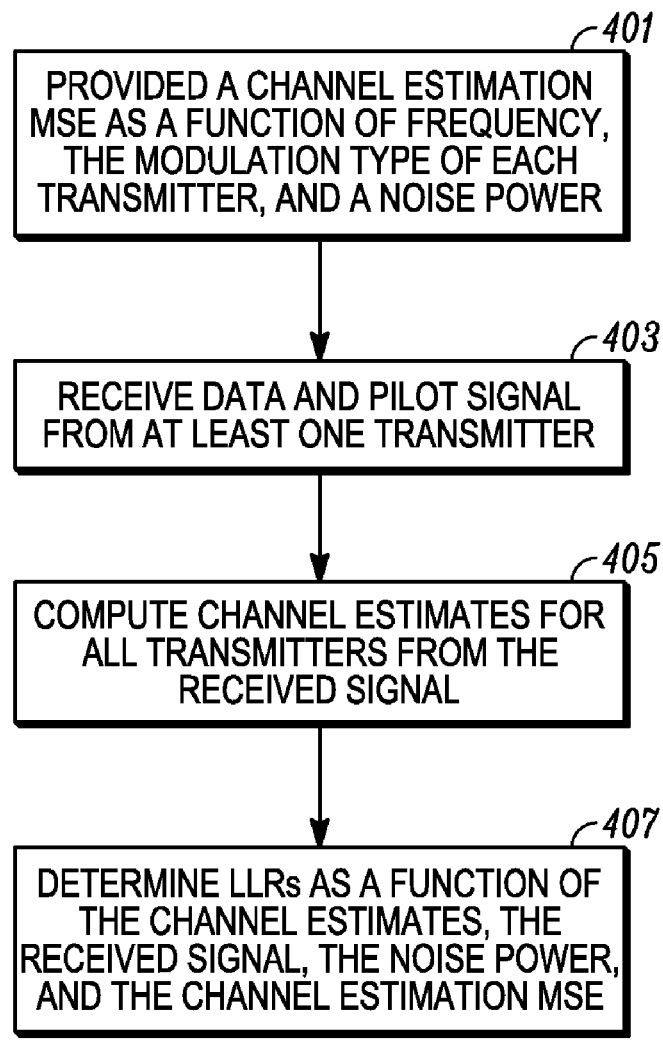
FIG. 4 is a flow chart illustrating a high level operation of a receiver in accordance with the various embodiments.

The high level operation of the receiver of FIG. 3 is illustrated in FIG. 4. Thus, in 401 a channel estimation MSE as a function of frequency, the transmitter modulation type, and a noise power are provided to the LLR circuitry 313. A signal from at least one transmitter is received at one of the various antennas 301, 303 and respective receiver circuitry 305, 307 in block 403. The channel estimation circuitry 309 computes a channel estimate for the signal from the transmitter, or computes multiple channel estimates for multiple transmitter sources, in block 405. In block 407, decoder inputs are determined as a function of the channel estimates, the received signal, noise power, and channel estimation MSE.

LLR generation with channel estimation error for embodiments employing linear MMSE combining is illustrated at a high level by FIG. 5 and is described in detail as follows.

The received M×1 signal, or input signal, on subcarrier k and symbol b, Y(k,b), is modeled as:

$$Y(k, b) = \sum_{u=1}^{N_s} H_u(k, b)x_u(k, b) + N(k, b) \quad (1)$$

where $H_u(k,b)$ is signal u's M×1 channel vector on subcarrier k and symbol b, $x_u(k,b)$ is signal u's symbol on subcarrier k and symbol b, and N(k,b) is an M×1 vector of additive noise with correlation matrix $\sigma_n^2 I$.

Because there is a channel estimate, the model of the received signal that will be used to calculate the LLRs is given as:

$$Y(k, b) = \sum_{u=1}^{N_s} \hat{H}_u(k, b)x_u(k, b) + \sum_{u=1}^{N_s} \{H_u(k, b) - \hat{H}_u(k, b)\}x_u(k, b) + N(k, b) \quad (2)$$

where $\hat{H}_u(k,b)$ is the channel estimate for signal u, as shown in block 505. Note that the combining weights assume the channel estimate is correct so that the received signal looks like the original one given in Equation (1) with an additional "noise" term that accounts for the channel estimation error.

The linear MMSE combining weights, as determined in block 507, are a function of the channel estimates from block 505 and are given for signal u as:

$$w_u(k, b) = \left( \sum_{v=1}^{N_s} \hat{H}_v(k, b)\hat{H}_v^H(k, b) + \sigma_n^2 I_M \right)^{-1} \hat{H}_u(k, b) \quad (3)$$

Defining $E_u(k,b) = H_u(k,b) - \hat{H}_u(k,b)$ and using Equation (2) the symbol estimate for signal u, as computed in block 509, is given as:

$$r_u(k, b) = w_u^H(k, b)Y(k, b) \quad (4)$$
$$= w_u^H(k, b)$$
$$\left( \sum_{v=1}^{N_s} \hat{H}_v(k, b)x_v(k, b) + \sum_{v=1}^{N_s} E_v(k, b)x_v(k, b) + N(k, b) \right)$$

To compute the LLRs as in block 511, $E_u(k,b)$ is assumed to be a zero-mean Gaussian random vector with correlation matrix, $\delta_u^2(k,b)I_M$ (i.e., $\delta_u^2(k,b)$ is the channel estimation MSE for signal u on subcarrier k and symbol b, the MSE being stored as shown in storage unit 311 of FIG. 3), and $E\{|K x_u(k,b)|^2\}$ is assumed to be one. Using these assumptions the frequency-domain symbol estimate for signal u, as illustrated in block 509 is modeled as:

$$r_u(k,b) = w_u^H(k,b)\hat{H}_u(k,b)x_u(k,b) + n_u(k,b) \quad (5)$$

where $n_u(k,b)$ is modeled as a zero-mean Gaussian random variable with variance given by:

$$\sigma_{r,u}^2(k, b) = w_u^H(k, b) \quad (6)$$
$$\left\{ \delta_u^2(k, b)|x_u(k, b)|^2 + \sum_{\substack{v=1 \\ v \neq u}}^{N_s} \hat{H}_v(k, b)\hat{H}_v^H(k, b) + \sum_{\substack{v=1 \\ v \neq u}}^{N_s} \delta_v^2(k, b) + \sigma_n^2 \right\}$$
$$w_u(k, b)$$

Note that this variance accounts for the residual cross talk after applying the weights as well as the channel estimation error from storage unit 311 and as shown in block 509. Note also that the variance depends on the magnitude of signal u's symbol but not on the amplitude of the other signals' symbols because the received symbol estimate for user u is conditioned on $x_u(k,b)$ and thus $x_v(k,b)$'s for $v \neq u$ are treated as random variables.

The probability density function (pdf) of $r_u(k,b)$ given $x_u(k,b)$ is then given by:

$$f(r_u(k, b) | x_u(k, b)) = \quad (7)$$
$$C \exp\left( -\frac{|r_u(k, b) - w_u^H(k, b)\hat{H}_u(k, b)x_u(k, b)|^2}{w_u^H(k, b)\{\delta_u^2(k, b)|x_u(k, b)|^2 + \sum_{\substack{v=1 \\ v \neq u}}^{N_s} \hat{H}_v(k, b)\hat{H}_v^H(k, b) + \sum_{\substack{v=1 \\ v \neq u}}^{N_s} \delta_v^2(k, b) + \sigma_n^2\}w_u(k, b)} \right)$$

where C is a constant that is not important for the LLR computation. Using Equation (7), the LLR for bit l for user u on subcarrier k and symbol b, $LLR\{b_{u,l}(k,b)\}$, is found as shown in block 511 as (assuming equal-probable symbol values):

$$LLR\{b_{u,l}(k, b)\} = \quad (8)$$
$$\log\left( \sum_{x_u(k,b) \in \Omega_l^+} f(r_u(k, b)|x_u(k, b)) \right) - \log\left( \sum_{x_u(k,b) \in \Omega_l^-} f(r_u(k, b)|x_u(k, b)) \right)$$

where $\Omega_l^+$ is the set of symbols where bit l of symbol $x_u(k,b)$ equals plus one and $\Omega_l^-$ is the set of symbols where bit l of symbol $x_u(k,b)$ equals minus one (or zero).

If the link is cyclic-prefix single carrier then the received time-domain signal is the IFFT of the frequency-domain symbol estimates in Equation (5) (spread-OFDM will also have similar modifications with, for example, the IFFT operation being replaced by Walsh de-spreading). Thus the time-domain symbol estimates are modeled as (assuming that the combining weights are unbiased):

$$\hat{s}_u(n,b) = s_u(n,b) + v_u(n,b) \quad (9)$$

where $s_u(0,b)$ through $s_u(N_f-1,b)$ are the $N_f$-point IFFT of the frequency-domain symbols ($0 \leq k \leq N_f - 1$), $x_u(k,b)$, and $v_u(n,b)$ is the IFFT of $n_u(k,b)$ for $0 \leq k < N_f - 1$.

The IFFT operation on $n_u(k,b)$ will equalize the channel estimation error across all time-domain symbols (i.e., all symbol estimates will have similar quality unlike the frequency-domain symbols where the symbol estimates at edge sub-carriers can be significantly worse than symbol estimates at non-edge sub-carriers). This means that $v_u(n,b)$ is modeled as a zero-mean Gaussian random variable with variance given by (using Parseval's theorem):

$$E[|v_u(n, b)|^2] = \frac{1}{N_f} \sum_{k=0}^{N_f-1} \sigma_{r,u}^2(k, b) \quad (10)$$

LLR generation with channel estimation error, for embodiments employing successive cancellation, is illustrated at a high level by FIG. 6 and is described in detail as follows.

In the various embodiments employing successive cancellation, $N_s$ received signals are decoded in some order and a signal is decoded, re-encoded, and mapped back to symbol values before being cancelled using the channel estimate for that signal. The decoding order may in some embodiments be chosen to pick the stream with the best average post-detection SINR (Signal to Interference plus Noise Ratio) at each iteration or can be decoded in order in embodiments employing techniques such as weighted-BLAST or MCR-selection BLAST. Thus, the decoding order is determined as illustrated in block 607.

Assuming that the decoding order determined in block 607 is $u_1$ through $u_{N_s}$ and setting the decoding index "n" to one as in block 609, the successive cancellation combining weights for signal $u_n$, for corresponding transmitter $u_n$, is determined as shown in block 611 and by:

$$w_{u_n}(k, b) = \left(\sum_{v=n}^{N_s} \hat{H}_{u_v}(k, b)\hat{H}_{u_v}^H(k, b) + \sigma_n^2 I_M\right)^{-1} \hat{H}_{u_n}(k, b) \quad (11)$$

Wherein it is assumed that each signal is decoded without errors so that the symbol estimate for signal $u_n$ which will be determined as shown in block 613, may be expressed as:

$$r_{u_n}(k, b) = w_{u_n}^H(k, b)\left\{Y(k, b) - \sum_{v=1}^{n-1} \hat{H}_{u_v}(k, b)x_{u_v}(k, b)\right\} \quad (12)$$
$$= w_{u_n}^H(k, b)\left(\sum_{v=n}^{N_s} \hat{H}_{u_v}(k, b)x_{u_v}(k, b) + \sum_{u=1}^{N_s} E_u(k, b)x_u(k, b) + N(k, b)\right)$$

It is important to note that in the various embodiments, only the portion of Y(k,b) in Equation (2) corresponding to the channel estimate times the symbol value is cancelled, not the channel estimation error term.

Figure 5:
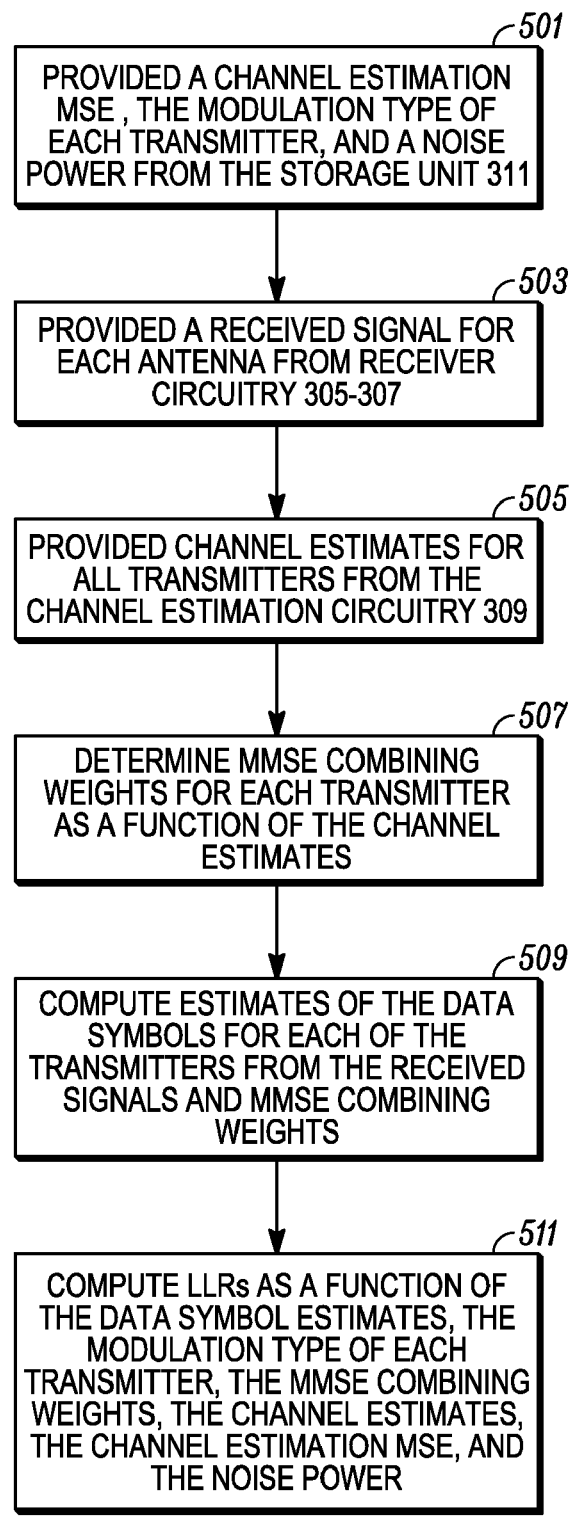
FIG. 5 is a flow chart illustrating a high level operation of a receiver in accordance with an embodiment employing linear Minimum Mean Square Error combing.

However, unlike the linear MMSE embodiments as illustrated in FIG. 5 and described in detail above, the amplitude of the decoded signal's symbols are known. As discussed above with respect to the computation of LLRs in block 511 of FIG. 5, that is, in the embodiments employing linear MMSE, it is assumed that $E\{|x_u(k,b)|^2\}=1$, since the other stream's symbols are unknown. Of course, in the embodiments employing successive cancellation, for the signals that have yet to be decoded, it will still be assumed that $E\{|x_u(k,b)|^2\}=1$.

Figure 6:
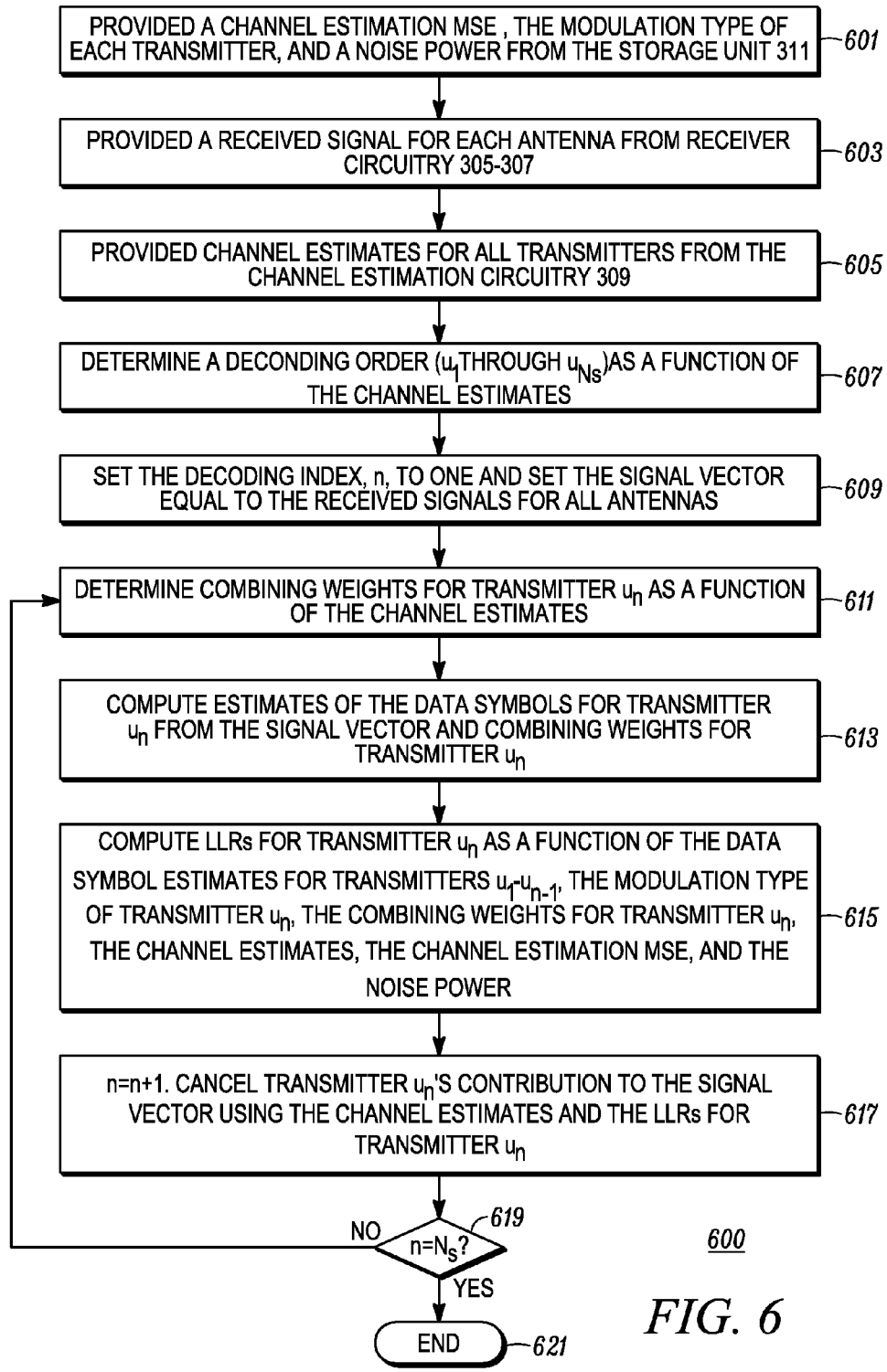
FIG. 6 is a flow chart illustrating a high level operation of a receiver in accordance with an embodiment employing successive cancellation.

Therefore, to calculate the LLRs as shown in block 615 of FIG. 6, the symbol estimate for signal $u_n$ is computed in block 613 and is further modeled as:

$$r_{u_n}(k,b) = w_{u_n}^H(k,b)\hat{H}_{u_n}(k,b)x_{u_n}(k,b) + n_{u_n}(k,b) \quad (13)$$

where $n_{u_n}(k,b)$ is assumed to be a zero-mean Gaussian random variable with variance given by:

$$w_{u_n}^H(k, b)\left\{\sum_{v=n+1}^{N_s}\{\hat{H}_{u_v}(k, b)\hat{H}_{u_v}^H(k, b) + \delta_{u_v}^2(k, b)\} + \right. \quad (14)$$
$$\left. \sum_{v=1}^{n}\delta_{u_v}^2(k, b)|x_{u_v}(k, b)|^2 + \sigma_n^2\right\}w_{u_n}(k, b)$$

The Probability Density Function (pdf) of $r_{u_n}(k,b)$ given $x_{u_n}(k,b)$ is then given by:

$$f(r_u(k, b)|x_u(k, b)) = \quad (15)$$
$$C \exp\left(-\frac{|r_{u_n}(k, b) - w_{u_n}^H(k, b)\hat{H}_{u_n}(k, b)x_{u_n}(k, b)|^2}{w_{u_n}^H(k, b)\{\sum_{v=n+1}^{N_s}\{\hat{H}_{u_v}(k, b)\hat{H}_{u_v}^H(k, b) + \delta_{u_v}^2(k, b)\} + \sum_{v=1}^{n}\delta_{u_v}^2(k, b)|x_{u_v}(k, b)|^2 + \sigma_n^2\}w_{u_n}(k, b)}\right)$$

where C is constant that is not important for the LLR computation. Using Equation (15), the LLR for bit l for user $u_n$ on subcarrier k and symbol b, LLR$\{b_{u_n,l}(k,b)\}$, is found as shown in block 615 as (and assuming equal-probable symbol values):

$$LLR\{b_{u_n,l}(k, b)\} = \log\left(\sum_{x_{u_n}(k,b)\in\Omega_l^+} f(r_{u_n}(k, b) | x_{u_n}(k, b))\right) - \quad (16)$$
$$\log\left(\sum_{x_{u_n}(k,b)\in\Omega_l^-} f(r_{u_n}(k, b) | x_{u_n}(k, b))\right)$$

As discussed above with respect to the embodiments employing linear MMSE, if the link is cyclic-prefix single carrier, the model of the symbol estimates will have to change similar to Equation (9).

Figure 7:
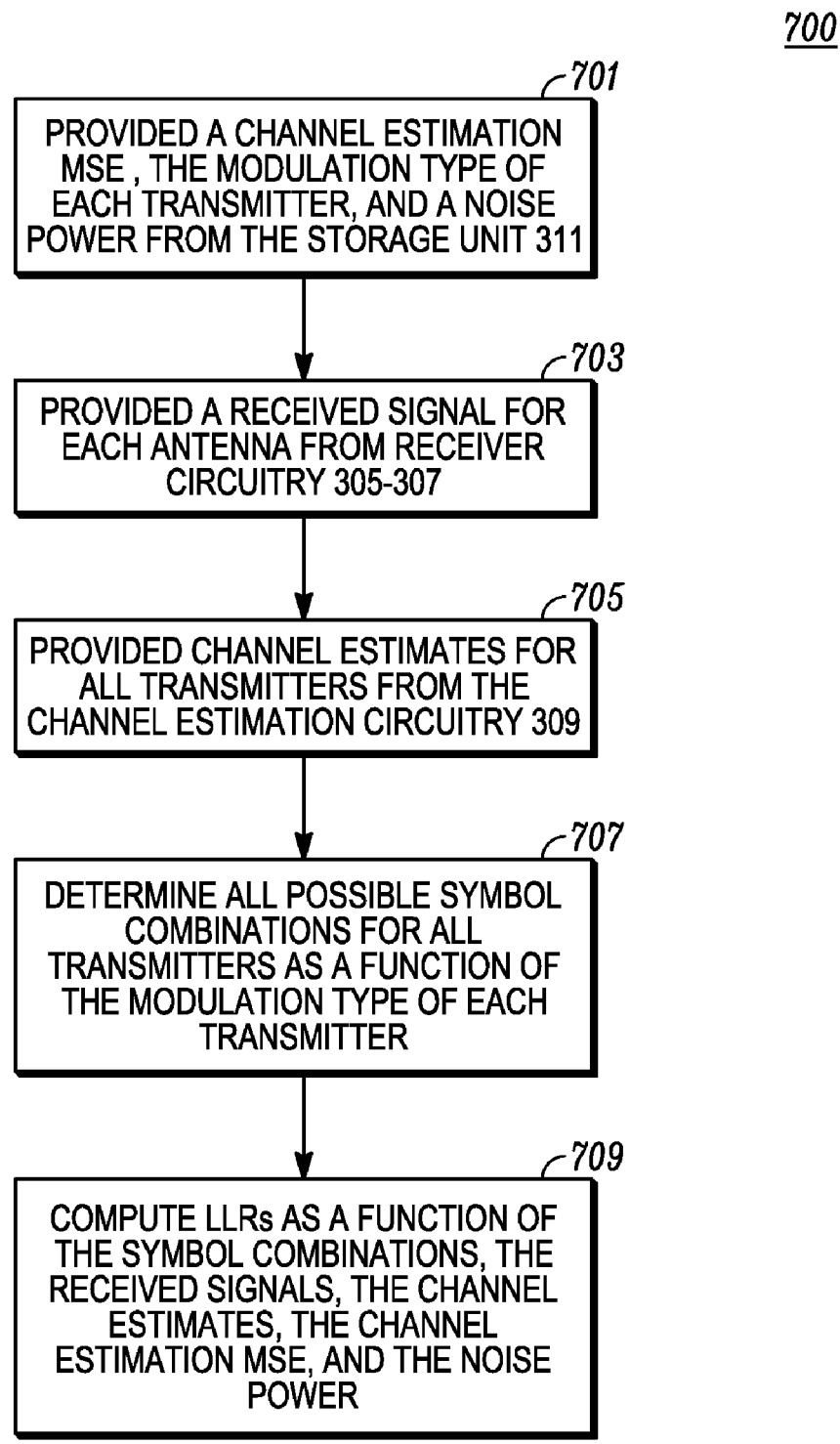
FIG. 7 is a flow chart illustrating a high level operation of a receiver in accordance with an embodiment employing joint detection reception.

LLR generation with channel estimation error, for embodiments employing joint detection, is illustrated at a high level by FIG. 7 and is described in detail as follows.

In the various embodiments employing joint detection, similar to Equation (2) the received signal, or input signal at antennas 301 and 303, is modeled as:

$$Y(k, b) = \sum_{u=1}^{N_s} \hat{H}_u(k, b)x_u(k, b) + \sum_{u=1}^{N_s} E_u(k, b)x_u(k, b) + N(k, b) \quad (17)$$

where $E_u(k,b)$ models the channel estimation error for signal u, as shown in block 701, and is assumed to be a zero-mean Gaussian random vector with correlation matrix $\delta_u^2(k,b)I_M$. The pdf of Y(k,b) given $x_1(k,b)$ through $X_{N_s}(k,b)$ is given as:

$$f(Y(k, b) | x_1(k, b), \ldots, x_{N_s}(k, b)) = \quad (18)$$
$$C \exp\left\{-\frac{|Y(k, b) - \sum_{u=1}^{N_s}\hat{H}_u(k, b)x_u(k, b)|^2}{\sigma_n^2 + \sum_{u=1}^{N_s}\delta_u^2(k, b)|x_u(k, b)|^2}\right\}$$

where C is a constant that will not be important in the LLR calculation.

As shown in block 709 and using Equation (18), the LLR for bit l of user u at subcarrier k and symbol b is given as:

$$LLR\{b_{u,l}(k,b)\} = \log\left(\sum_{x_u(k,b)\in\Omega_l^+}\sum_{\substack{v=1\\v\neq u}}^{N_s}\sum_{x_v(k,b)\in\Omega}\exp\right. \quad (19)$$

$$\left.\left\{-\frac{\left|Y(k,b)-\sum_{w=1}^{N_s}\hat{H}_w(k,b)x_w(k,b)\right|^2}{\sigma_n^2+\sum_{w=1}^{N_s}|x_w(k,b)|^2\delta_w^2(k,b)}\right\}\right) - \log$$

$$\left(\sum_{x_u(k,b)\in\Omega_l^-}\sum_{\substack{v=1\\v\neq u}}^{N_s}\sum_{x_v(k,b)\in\Omega}\exp\left\{-\frac{\left|Y(k,b)-\sum_{w=1}^{N_s}\hat{H}_w(k,b)x_w(k,b)\right|^2}{\sigma_n^2+\sum_{w=1}^{N_s}|x_w(k,b)|^2\delta_w^2(k,b))}\right\}\right)$$

where $\Omega$ is the set of possible symbols values, which may be for example in some embodiments, all sixteen 16-QAM constellation points, $\Omega_l^+$ is the set of symbols where bit 1 on symbol $x_u(k,b)$ equals plus one, and $\Omega_l^-$ is the set of symbols where bit 1 on symbol $x_u(k,b)$ equals minus one (or zero). Since in equation (19) the summation over all possible symbols values (i.e., all symbol values in $\Omega$, $\Omega_l^+$, or $\Omega_l^-$) may have excessively high computational complexity, methods with lower complexity but nearly the same performance may be employed such as sphere decoding.

In sphere decoding, certain symbol values are removed from the set of all symbol values because it is determined that it was very improbable that they were sent from the transmitters. Thus the LLR calculation for sphere decoding would use a similar formula to equation (19) except that the summations would be done only over the likely symbol values (i.e., not over the symbol values that were determined to be sent with very low probability). In other words, instead of using the set of all possible data symbol combinations to determine the LLRs, a set of possible data symbol combinations is determined (e.g., using sphere decoding ideas) for each transmitter and the set of possible data symbol combinations is used to determine the LLRs in place of the set of all possible data symbol combinations.

In order to calculate the LLRs given in Equations (8), (16) and (19), that is, for any of the various embodiments, for example as shown in blocks 407, 511, 615 and 709, the channel estimation error for each signal at each subcarrier and symbol time is needed. For linear frequency domain channel estimators such as an MMSE channel estimator, including an MMSE Finite Impulse Response (FIR) channel estimator, a time-tap Least Squares (LS) channel estimator, and Discrete Fourier Transformation (DFT) type channel estimators, the channel estimation error is readily found in the various embodiments. Further in the various embodiments, by using the expected channel conditions, the channel estimation error may be anticipated and thus may be pre-computed and stored in memory at the receiver, for example storage unit 311 of FIG. 3.

Therefore, in the various embodiments, the channel estimator is assumed to have the following form:

$$\hat{H}_{u,m}(k,b) = q_u^H(k,b)Y_{p,m} \quad (20)$$

where $q_u(k,b)$ is a P×1 vector of channel estimation coefficients (P is the number of pilot symbols) for signal u at subcarrier k and symbol time b and $Y_{p,m}$ is the following P×1 vector of the received pilot data on antenna m for example, antenna 301:

$$Y_{p,m} = \begin{bmatrix} Y_m(k_1,b_1) \\ \vdots \\ Y_m(k_P,b_P) \end{bmatrix} = \sum_{u=1}^{N_s}\begin{bmatrix} H_{u,m}(k_1,b_1) \\ \vdots \\ H_{u,m}(k_P,b_P) \end{bmatrix}X_{p,u} + \begin{bmatrix} N_m(k_1,b_1) \\ \vdots \\ N_m(k_P,b_P) \end{bmatrix} \quad (21)$$

where $\{k_1,b_1\}$ through $\{k_P,b_P\}$ are the pilot locations and $X_{p,u} = \mathrm{diag}(x_u(k_1,b_1), \ldots, x_u(k_P,b_P))$.

The channel estimation error for user u is determined as:

$$\delta_u^2(k,b) = E\{|H_{u,m}(k,b) - \hat{H}_{u,m}(k,b)|^2\} \quad (22)$$

Using Equations (20), (21) and (22), the channel estimation error becomes:

$$\delta_u^2(k,b) = E\left\{\left|H_{u,m}(k,b) - \right.\right. \quad (23)$$

$$\left.\left. q_u^H(k,b)\left\{\sum_{u=1}^{N_s}\begin{bmatrix} H_{u,m}(k_1,b_1) \\ \vdots \\ H_{u,m}(k_P,b_P) \end{bmatrix}X_{p,u} + \begin{bmatrix} N_m(k_1,b_1) \\ \vdots \\ N_m(k_P,b_P) \end{bmatrix}\right\}\right|^2\right\}$$

Simplifying Equation (23), the channel estimation error becomes:

$$\delta_u^2(k,b) = \quad (24)$$

$$r(0,0) + q_u^H(k,b)Rq_u(k,b) - 2\mathrm{Re}\left\{q_u^H(k,b)\begin{bmatrix} r(k_1-k,b_1-b) \\ \vdots \\ r(k_P-k,b_P-b) \end{bmatrix}X_{p,u}\right\}$$

where Re{a} means the real part of a, $r(k-f,b-t) = E\{H_m(k,b)H_m^*(f,t)\}$, and P×P R is given by:

$$R = \sigma_n^2 I_P + \sum_{u=1}^{N_s} X_{p,u} \quad (25)$$

$$\begin{bmatrix} r(0,0) & r(k_1-k_2,b_1-b_2) & r(k_1-k_3,b_1-b_3) & \cdots & r(k_1-k_P,b_1-b_P) \\ r(k_2-k_1,b_2-b_1) & r(0,0) & r(k_2-k_3,b_2-b_3) & \cdots & r(k_2-k_P,b_2-b_P) \\ \vdots & & \ddots & & \vdots \\ r(k_P-k_1,b_P-b_1) & r(k_P-k_2,b_P-b_2) & \cdots & & r(0,0) \end{bmatrix}$$

$$X_{p,u}^H$$

Figure 8A:
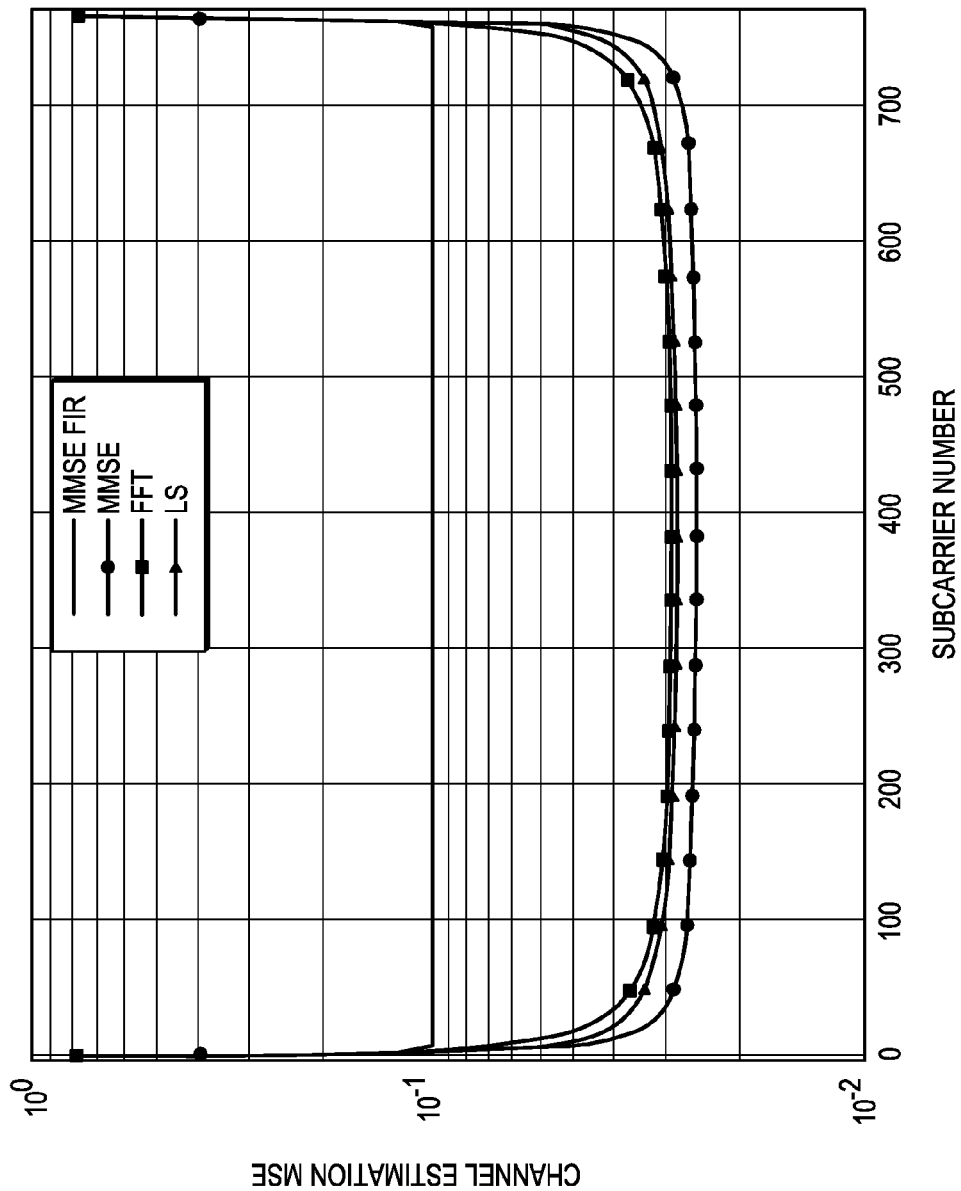
FIGS. 8a and 8b are graphs of simulation results for a receiver in accordance with an embodiment, showing channel estimation error versus subcarrier for joint channel estimation of four signals using a single OFDM symbol of a pilot.
Figure 8B:
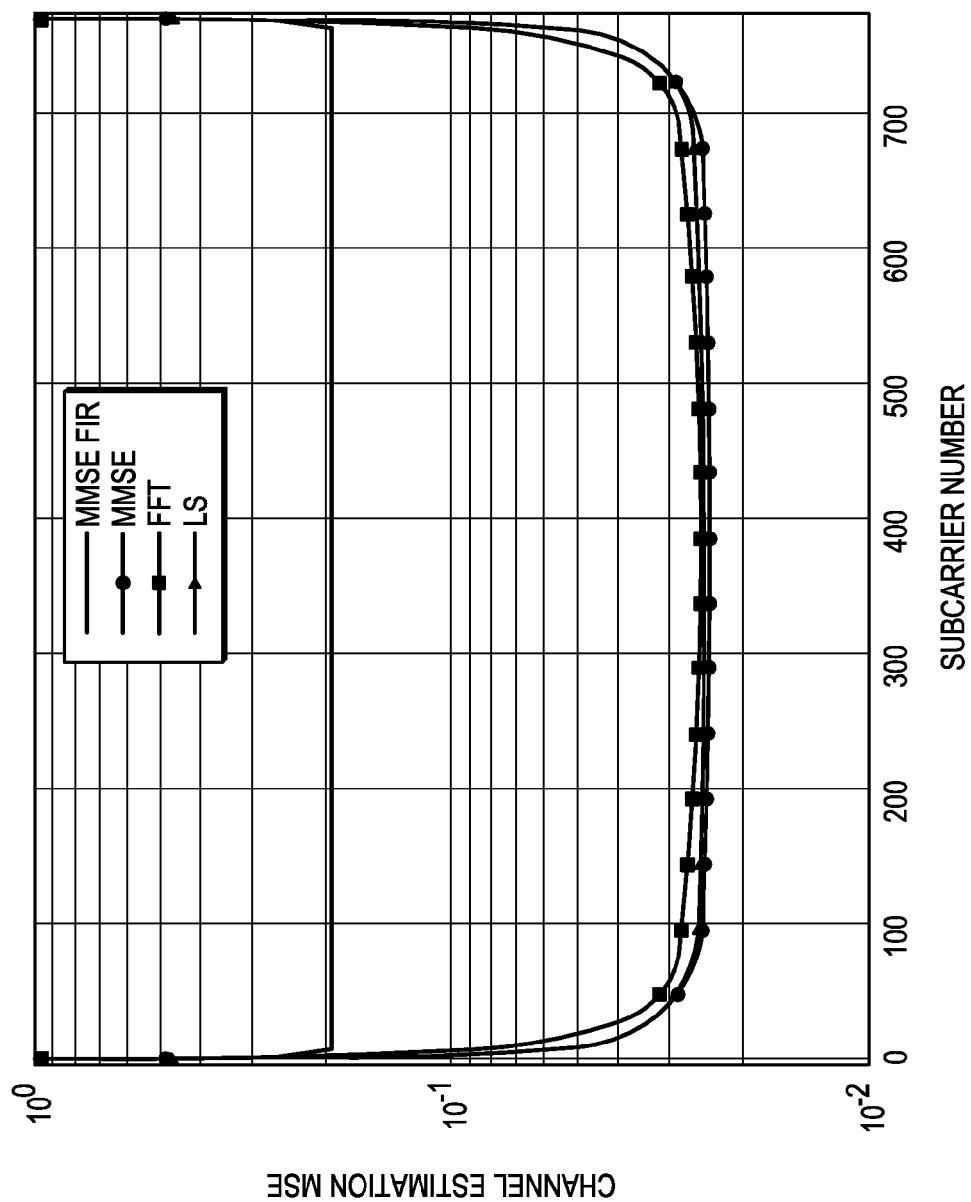

To further facilitate the understanding of the various embodiments disclosed herein, examples of the expected channel estimation error are provided in FIGS. 8a and 8b, for an OFDM system with 768 subcarriers that span 19.2 MHz with an FFT size of 1024. There are four signals (i.e., a receive SDMA of four) with pilot symbols spanning an entire OFDM symbol. Signal one's pilots are random 16-PSK symbols and the other signal's pilot symbols are encoded using Steiner's method as follows:

$$x_u(k,b) = x_1(k,b)e^{-j2\pi(u-1)k/4} \quad (26)$$

All channel estimates are designed assuming each user's delay profile was a 10 μsec flat profile. For the simulation results, each SDMA user's channel uses a COST-259-style spatial channel model consisting of a single scattering zone having 50 discrete multi-path rays and a 2 μsec RMS delay spread. The SNR was 10 dB for both the theoretical results and simulations. The channel estimation strategies compared are the MMSE FIR channel estimation with a 17 tap filter, the MMSE channel estimator as described in Vook and Thomas, *MMSE Multi-User Channel Estimation for Broadband Wireless Communications*, IEEE Globecom-2001 in San Antonio Tex. (November 2001), which is incorporated by reference herein, a Least Squares (LS) time-tap estimator with an FFT size of 800, and a DFT-based channel estimator (labeled "FFT" estimator).

FIGS. 8a and 8b compare the theoretical channel estimation error using Equation (24) to simulation results. Thus FIG. 8a illustrates channel estimation error versus subcarrier number for joint channel estimation of four signals using a single OFDM symbol of Steiner's encoded pilots, and shows theoretical results for a 10 μs flat delay profile. FIG. 8b illustrates simulated results using an exponential decaying 2 μs RMS delay spread channel. The SNR for FIGS. 8a and 8b was 10 dB. It is to be noted that the theoretical results closely match the simulation results despite the simulations using an exponentially decaying power-delay profile and the channel estimators assuming a flat power delay profile. As expected, the performance of all channel estimators severely degrades at the edge subcarriers indicating that the LLRs are less reliable at these subcarriers. Note that the MMSE FIR filter example has difficulties obtaining channel estimates because of the small number of taps used.

Figure 9A:
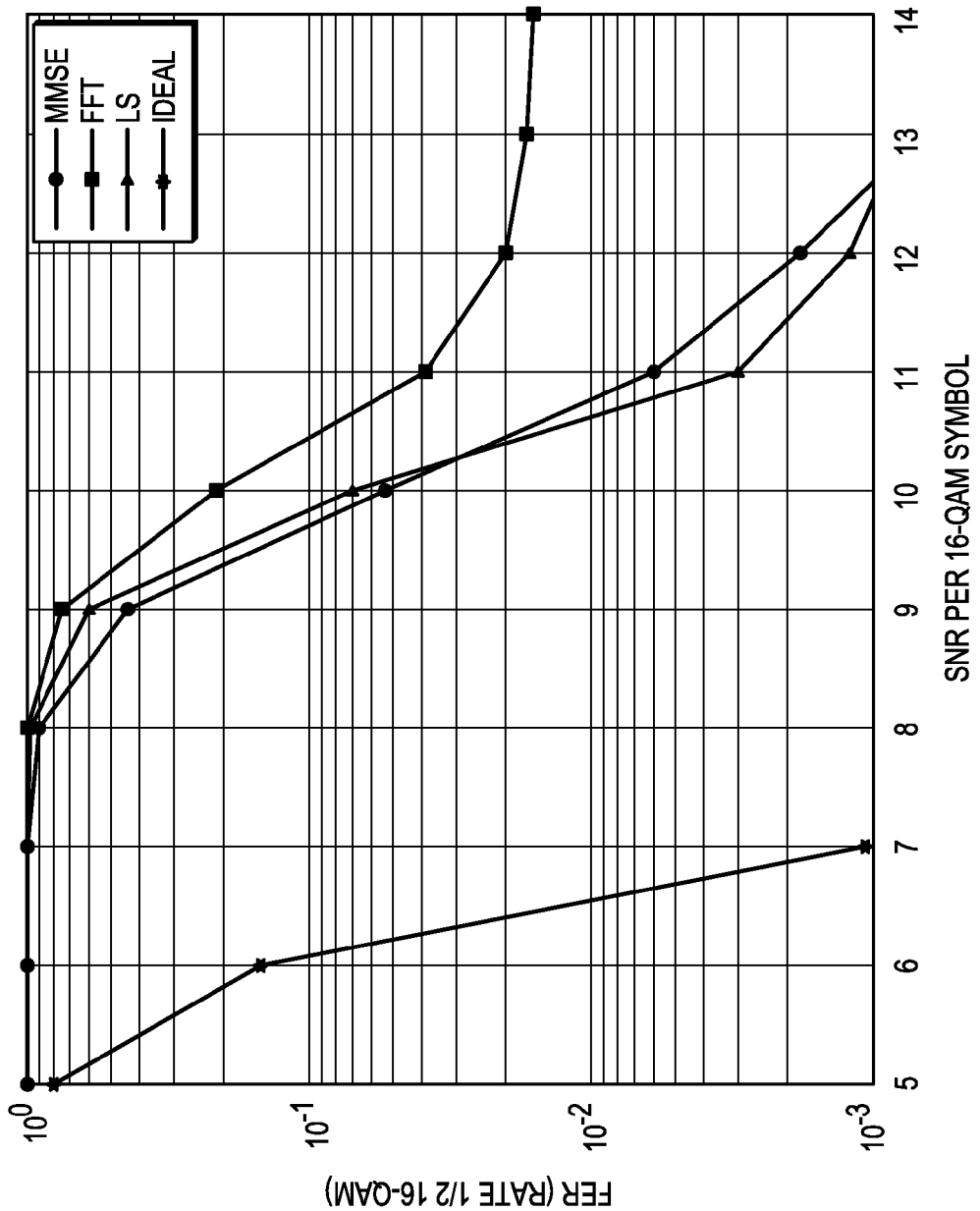
FIG. 9a is a graph of simulation results for prior receivers showing Frame Error Rate versus Signal to Noise Ratio per 16-QAM symbol.
Figure 9B:
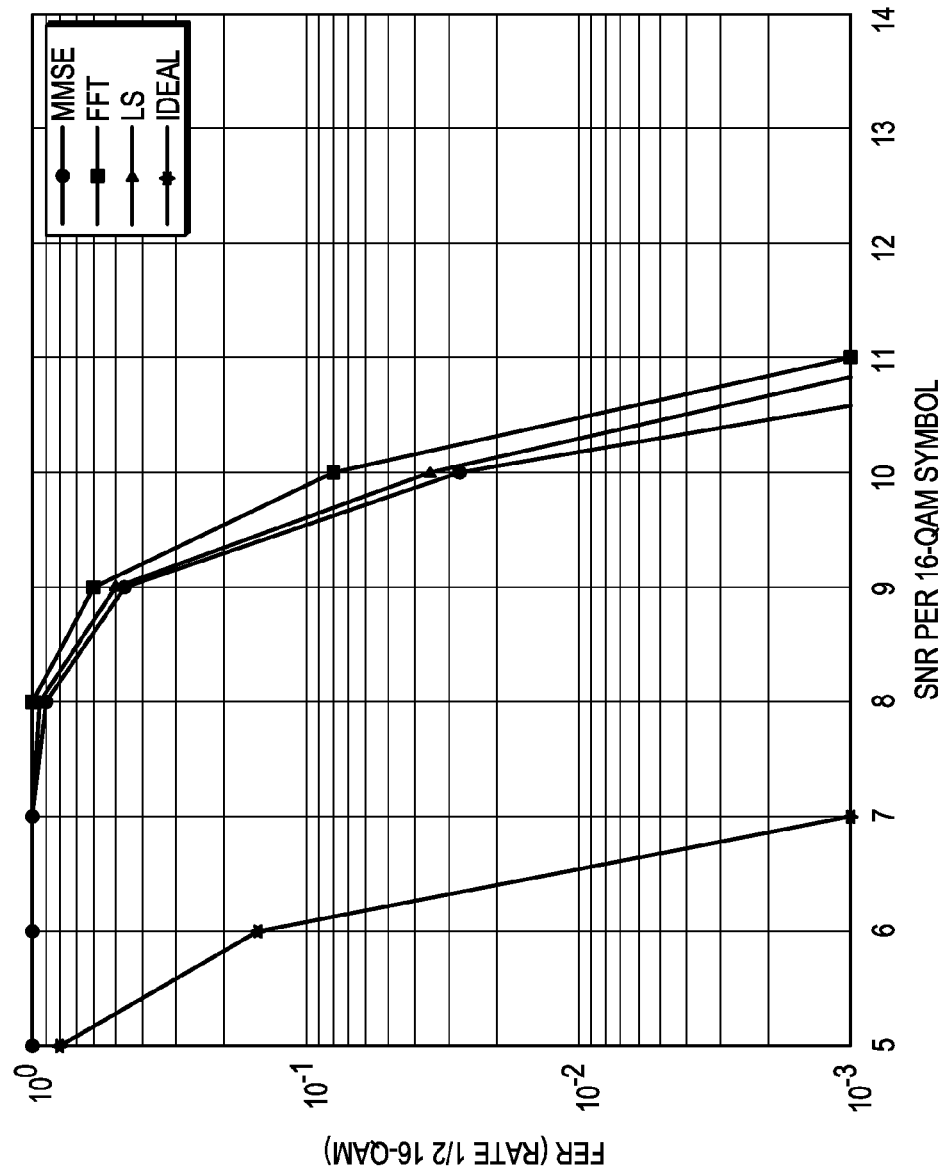
FIG. 9b is a graph of simulation results for a receiver in accordance with an embodiment, showing Frame Error Rate versus Signal to Noise Ratio per 16-QAM symbol.
Figure 10A:
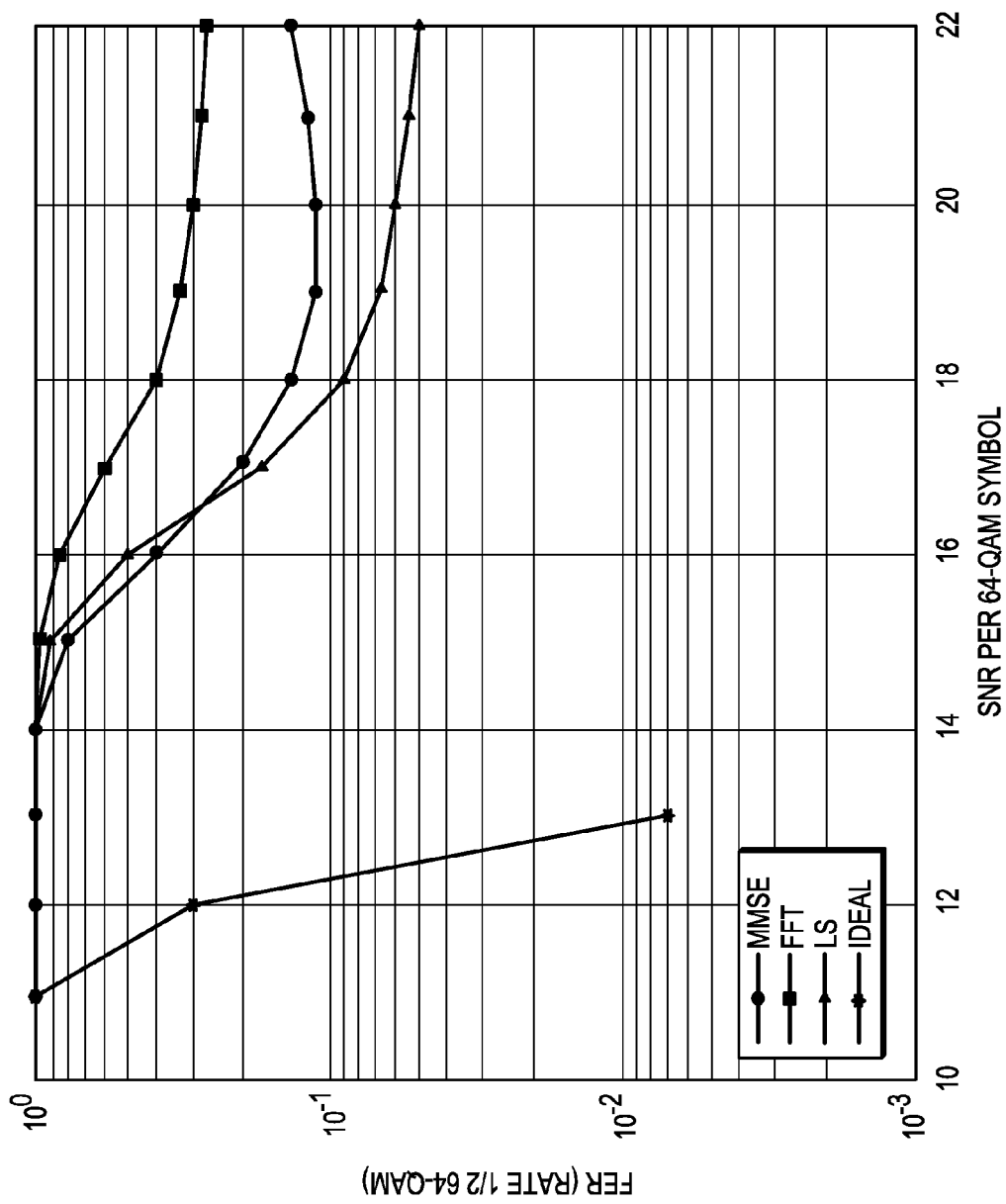
FIG. 10a is a graph of simulation results for a prior receiver, showing Frame Error Rate versus Signal to Noise Ratio per 64-QAM symbol.
Figure 10B:
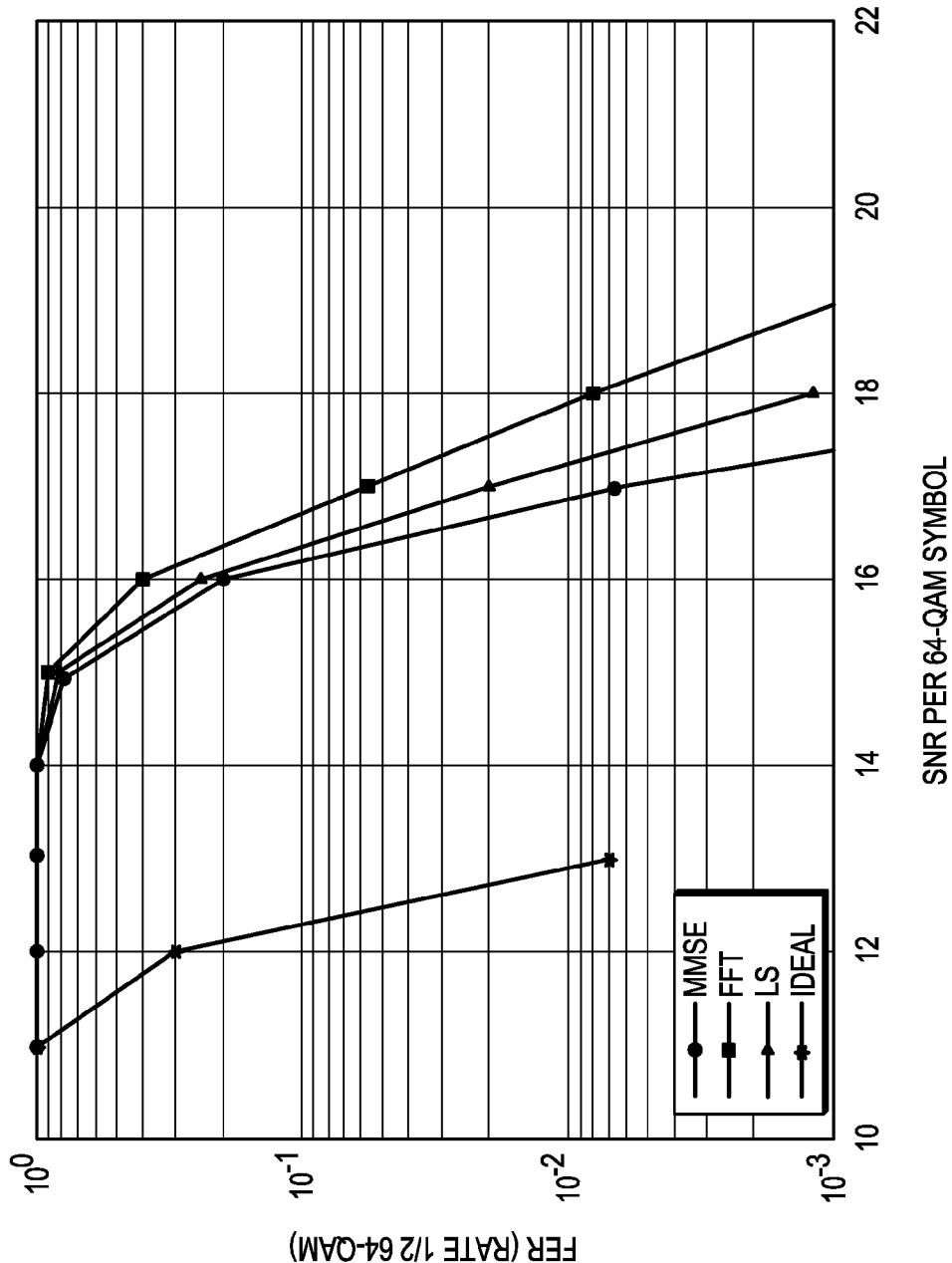
FIG. 10b is a graph of simulation results for a receiver in accordance with an embodiment, showing Frame Error Rate versus Signal to Noise Ratio per 64-QAM symbol.

FIGS. 9a and 10a provide simulation results without the various embodiments and for comparison, FIGS. 9b and 10b provide simulation results with the various embodiments wherein channel estimation error is tracked in an OFDM uplink. The simulations use a COST-259 style spatial channel model consisting of a single scattering zone having 100 discrete multi-path rays, a 2 μs RMS delay spread, and a 15° multi-path angular spread with respect to the base antenna array.

In examples illustrated by FIGS. 9a, 9b, 10a and 10b, the base has a uniform linear array of four antennas with a five-wavelength spacing between the antenna elements. The OFDM system uses a 1024-point FFT with a 25 kHz subcarrier spacing at a 3.7 GHz carrier frequency. The cyclic prefix length is 256 (10 μs) and the total OFDM symbol duration is 50 μs.

For the simulations, the 3GPP turbo code with max-log-map decoding was used. There are four SDMA users and the pilot format consists of a single OFDM symbol with the pilot structure as per Equation (26). One-thousand (1000) channel realizations were run for each SNR point and there are ten data frames (separately coded) following the pilot sequence. The FER curves are averaged over all SDMA users.

FIGS. 9a, 9b, 10a and 10b show FER results for rate 1/2 turbo-coded 16-QAM and rate 1/2 turbo-coded 64-QAM respectively for three channel estimators; MMSE, Least Squares (LS) time-tap estimator, and a DFT-based estimator. All three estimators assume a flat delay profile with a maximum delay spread of 10 μs. The receiver simulated employed successive cancellation with the optimal stream decoding order. For the successive cancellation operation, before a stream is cancelled it is first decoded, then re-encoded, and mapped back to symbol values. A clear improvement is illustrated in FIG. 9b and FIG. 10b, wherein the embodiments herein disclosed are employed, over the previous methods illustrated in FIG. 9a and FIG. 10a.

It is to be understood that the various embodiments and inventive principles and concepts discussed and described herein may be particularly applicable to receivers and associated communication units, devices, and systems providing or facilitating voice communications services or data or messaging services over wide area networks (WANs), such as conventional two way systems and devices, various cellular phone systems including, but not limited to, analog and digital cellular, and any networks employing Spatial Division Multiple Access (SDMA), Spatial Division Multiplexing (SDM), Orthogonal Frequency Division Multiple Access (OFDMA), Orthogonal Frequency Division Multiplexing (OFDM) and any variants thereof.

Principles and concepts described herein may further be applied in devices or systems with short range communications capability normally referred to as W-LAN capabilities, such as IEEE 802.11, Hiper-LAN or 802.16, WiMAX, digital video broadcasting (DVB), and the like that may further utilize CDMA, frequency hopping, orthogonal frequency division multiplexing, or TDMA technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a receiver having multiple antennas, said method comprising:
    receiving an input signal on each antenna;
    computing channel estimates for each antenna, as a function of said input signal;
    determining a channel decoder input as a function of said channel estimates, said input signal, a noise power, and a channel estimation Mean Square Error, said channel estimation Mean Square Error representing a channel estimation error between said channel estimates and channel vectors; and
    wherein said channel estimation Mean Square Error is a function of frequency.

2. The method of claim 1, wherein said channel decoder input is a logarithm of a likelihood ratio.

3. The method of claim 1, further comprising:
    determining a codeword estimate using said channel decoder input.

4. The method of claim 1, wherein computing said channel estimates for each antenna, as a function of said input signal is a frequency domain function.

5. A method of operating a receiver having multiple antennas, said method comprising:
- receiving on each antenna, an input signal being conglomerated transmitted signals from multiple transmitters wherein each of said transmitted signals corresponds to a given transmitter and to a given modulation type;
- computing channel estimates for each antenna as a function of said input signal;
- determining Minimum Mean Square Error (MMSE) combining weights as a function of said channel estimates;
- computing data symbol estimates using said input signal and said MMSE combining weights; and
- determining a channel decoder input as a function of said data symbol estimates, said given modulation type, said channel estimates, said MMSE combining weights, a noise power and a channel estimation Mean Square Error, said channel estimation Mean Square Error representing a channel estimation error between said channel estimates and channel vectors.

6. The method of claim 5, further comprising:
- determining a codeword estimate using said channel decoder input.

7. The method of claim 6 further comprising:
- determining an input signal component estimate for a given transmitter on said each antenna as a function of said codeword estimate and said channel estimates; and
- canceling said input signal component estimate from said input signal.

8. The method of claim 7, further comprising:
- determining an order in which input signal component estimates are determined by selecting an input signal component based on the best average post-detection Signal-to-Interference plus Noise-Ratio (SINR).

9. A method of operating a receiver having multiple antennas, said method comprising:
- receiving on each antenna, an input signal being conglomerated transmitted signals from multiple transmitters wherein each of said transmitted signals corresponds to a given transmitter and to a given modulation type;
- computing channel estimates for each antenna as a function of said input signal;
- determining a set of possible data symbol combinations for each said transmitter as a function of each said transmitter given modulation type; and
- determining a channel decoder input as a function of said data symbol combinations, said input signal on each antenna, said channel estimates for each antenna, a noise power and a channel estimation Mean Square Error, said channel estimation Mean Square Error representing a channel estimation error between said channel estimates and channel vectors.

10. The method of claim 9, wherein determining a set of possible data symbol combinations for each said transmitter as a function of each said transmitter given modulation type further comprises employing sphere decoding for determining a set of data symbol vectors.

11. A receiver unit comprising:
- at least two antennas;
- at least two receiver components, each receive component coupled to one of said at least two antennas;
- a channel estimation component coupled to each of said at least two receiver components;
- a log-likelihood-ratio calculation component coupled to said channel estimation component;
- a channel decoding component coupled to said log-likelihood ratio calculation component;
- a storage component coupled to said log-likelihood-ratio calculation component for storing channel estimation Mean Square Error, modulation types, and noise power;
- and wherein for an input signal received on each of said at least two antennas said channel estimation component is configured to compute channel estimates for each of said at least two antennas as a function of said input signal; said log-likelihood-ratio calculation component is configured to determine input to said channel decoding component as a function of said channel estimates, said input signal, a noise power, and a channel estimation Mean Square Error, said channel estimation Mean Square Error representing a channel estimation error between said channel estimates and channel vectors, and said noise power and said channel estimation Mean Square Error being provided to said log-likelihood-ratio calculation component by said storage component.

12. The receiver unit of claim 11, wherein said at least two receiver components may receive signals having a plurality of modulation types.

13. The receiver unit of claim 12, wherein said modulation types comprise at least one of BSPK (Binary Phase-Shift Keying), QPSK (Quadrature Phase-Shift Keying), 16-QAM (Quadrature Amplitude Modulation) or 64-QAM.

* * * * *